US012093194B2

(12) United States Patent
Ballard et al.

(10) Patent No.: US 12,093,194 B2
(45) Date of Patent: Sep. 17, 2024

(54) STORAGE SYSTEM PORT INFORMATION MANAGEMENT

(71) Applicant: HEWLETT PACKARD ENTERPRISE DEVELOPMENT LP, Houston, TX (US)

(72) Inventors: Curtis C. Ballard, Eaton, CO (US); Krishna Babu Puttagunta, Rocklin, CA (US); Rupin Tashi Mohan, Northborough, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/051,345

(22) Filed: Oct. 31, 2022

(65) Prior Publication Data
US 2024/0143520 A1    May 2, 2024

(51) Int. Cl.
G06F 13/14    (2006.01)
G06F 13/16    (2006.01)

(52) U.S. Cl.
CPC ...... *G06F 13/1668* (2013.01); *G06F 2213/16* (2013.01)

(58) Field of Classification Search
CPC .......................... G06F 13/1668; G06F 2213/16
See application file for complete search history.

(56) References Cited

U.S. PATENT DOCUMENTS

| 7,194,538 | B1 | 3/2007 | Rabe et al. |
| 7,350,052 | B2* | 3/2008 | Mizuno ............... H04L 67/1097 711/209 |
| 7,685,261 | B1 | 3/2010 | Marinelli et al. |
| 8,195,900 | B2* | 6/2012 | Kamakura ............. G06F 3/065 707/801 |
| 8,266,401 | B2* | 9/2012 | Nagata ............... G06F 11/2069 711/162 |
| 8,943,227 | B2* | 1/2015 | Klughart ............ G06F 13/4072 710/5 |
| 9,417,819 | B2* | 8/2016 | Smith .................... G06F 3/0679 |
| 11,012,510 | B2 | 5/2021 | Sethuraman et al. |
| 2021/0064281 | A1 | 3/2021 | Satapathy et al. |
| 2021/0337022 | A1 | 10/2021 | Puttagunta et al. |

OTHER PUBLICATIONS

IBM Corporation; "Detection and reporting of fabric problems", Mar. 22, 2021, 12 pages.
(Continued)

*Primary Examiner* — Cheng Yuan Tseng
(74) *Attorney, Agent, or Firm* — Trop, Pruner & Hu, P.C.

(57) ABSTRACT

In some examples, a management system receives, from a first storage system, first port information of ports in the first storage system, and receives, from a second storage system, second port information of ports in a second storage system. The management system merges the first port information from the first storage system and the second port information from the second storage system into merged port information. The management system receives, from the first storage system, a request for port information of ports in the second storage system, and sends, to the first storage system, the second port information for use in path selection from hosts to the first and second storage systems.

19 Claims, 4 Drawing Sheets

(56) References Cited

OTHER PUBLICATIONS

IBM Corporation; "Viewing SAS fabric path information"; Apr. 14, 2021, 3 pages.

Hewlett Packard Enterprise Development LP, "Port and host management", available online at <<https://www.hpe.com/psnow/doc/c04204251>, Dec. 2018, HPE 3PAR Command Line Interface Administrator Guide, pp. 1, 93-113.

Hewlett Packard Enterprise Development LP, "showvlun," available online at <<https://www.hpe.com/psnow/doc/c04204279>>, Mar. 2021, HPE 3PAR Command Line Interface reference guide, pp. 1, 543-548.

Aptare, Inc., "Array iSCSI Port Utilization", available online at <https://aptaredocs.veritas.com/10.0/index.html#page/Report%20Reference%20Guide/$H_38.html>, Apr. 14, 2016, 1 page.

Hewlett Packard Enterprise Development LP, "HPE SSMC 3.6 User Guide", Edition: 1, <https://support.hpe.com/hpesc/public/api/document/a00085217en_us>, Sep. 2019, 233 pages.

Hugo Landau, "A brief introduction to SCSI," available online at < https://www.devever.net/~hl/scsi>.>, Sep. 7, 2020, 10 pages.

NetApp, Inc., "Connected Ports Report", available online at <https://library.netapp.com/ecmdocs/ECMP1154891/html/GUID-F69D1E73-A6A5-4822-92D9-5D33F8E20E4A.html>, Mar. 2013, 1 page.

NetApp, Inc., "storage array commands," Sep. 27, 2022, ONTAP 9.10.1 commands, 20 pages.

Oracle, "Report Target Port Groups (A3h)," May 2022, StorageTek SL4000 Modular Library System SCSI Reference Guide, pp. 3-44-3-46.

Pearson Education, "ALUA,", Storage Design and Implementation in vSphere 6: A Technology Deep Dive, 2nd Edition, available online at <https://www.pearsonitcertification.com/articles/printerfriendly/2819032>, Oct. 5, 2017, 15 pages.

Red Hat, Inc., "KERNEL," available Sep. 24, 2019, Red Hat Enterprise Linux 6.6 Release Notes, Chapter 1, <https://web.archive.org/web/20190924201129/https://access.redhat.com/documentation/en-us/red_hat_enterprise_linux/6/html/6.6_release_notes/kernel>, 2 pages.

Seagate Technology LLC, "Vital product data parameters", SCSI Commands Reference Manual: Serial Attached SCSI (SAS), Rev. M, Sec. 5.4, available online at <<https://www.seagate.com/files/staticfiles/support/docs/manual/Interface%20manuals/100293068m.pdf?pdhname=MAKARA>.>, Jun. 2022, pp. 527-578.

Storage Networking Industry Association (SNIA), "Multipath Management API," Version 1.0, Feb. 2005, 109 pages.

* cited by examiner

STORAGE SYSTEM PORT INFORMATION MANAGEMENT

BACKGROUND

A computing environment can include storage systems to store data, and hosts that can access the storage systems over a network. In some cases, there may be multiple possible paths from a host to data in a storage system.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A storage system can include a storage controller (or multiple storage controllers) that can manage access (read and write) of data stored in a collection of storage devices. As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

A "collection" of items as used here can refer to a single item or multiple items. Thus, a "collection of storage devices" can refer to a single storage device or multiple storage devices. In some examples, the collection of storage devices managed by a storage controller is part of the storage system.

A "storage system" can thus include a collection of storage controllers and a collection of storage devices, as well as interconnect(s) between the collection of storage controllers and the collection of storage devices.

A "storage device" can refer to any device that is capable of storing data, such as a disk-based storage device (e.g., a hard drive, an optical drive, etc.), a solid-state drive (SSD), and so forth.

A "host" can refer to an entity that is able to interact with a storage system. A host can refer to a computer or a program (including machine-readable instructions). For example, a host can refer to a server computer, a user computer, a smart phone, a game appliance, a vehicle, an Internet-of-Things (IoT) device, a program (e.g., an application program, an operating system (OS), firmware, etc.), or any other type of entity.

Data can be arranged as logical storage volumes stored in storage devices. A "storage volume" can refer to any unit of data that can be identified using an identifier. A storage volume can be stored in a single storage device or across multiple storage devices. In some examples, an identifier of a storage volume can be in the form of a logical unit number (LUN). In other examples, other types of identifiers of storage volumes can be employed.

In a computing environment with multiple storage systems to which hosts are coupled over a network, multiple paths may be present between a host and a given storage volume stored in a storage system.

A network can include a storage area network (SAN), a local area network (LAN), a wide area network (WAN), a public network such as the Internet, or any other type of network, whether wired and/or wireless. A "path" can refer to a link from the host to the given storage volume, where the link includes a route through a network and includes a storage system (or more specifically, a port of a storage controller of the storage system) over which the host can issue access requests (read requests and write requests) to the give storage volume.

A storage controller can include ports through which hosts are able to issue access requests to access data. A "port" can refer to an interface of the storage controller over which communications can occur. A port can include a physical port or a virtual port.

The multiple paths over which a host may be able to access a given storage volume may have different characteristics that can affect performance in the access of data of the given storage volume by the host. In some examples, a characteristic of a path can include a path status of the path. In some examples, a path status can be expressed as an access state of a port group, which includes a single port or multiple ports of a storage system. A discussion of example access states of port groups is provided further below.

For a host to select a path from multiple paths to a storage volume, the host first determines the available paths and the respective path statuses (e.g., access states of port groups). In some cases, hosts can issue path status requests to probe the statuses of respective paths (or more specifically, to obtain access states of port groups, for example). In an example, the status requests are in the form of Small Computer System Interface (SCSI) commands, e.g., a REPORT TARGET PORT GROUPS SCSI command. In other examples, path status requests can be according to other protocols, which can include standardized protocols, open-source protocols, or proprietary protocols.

A first storage system may not have port information about a second storage system. For example, a data migration from the first storage system to the second storage system may be occurring, in which data of the first storage system is moved or copied to the second storage system.

During the data migration, port information regarding ports of the second storage system may not be available to the first storage system. Thus, if a host were to issue a path status request to the first storage system, the first storage system may be unable to provide port information relating to the second storage system, where such port information relating to the second storage system may be relevant to determining path statuses of paths to storage volumes stored by the first and second storage systems. As a result, when the host performs path selection to select a path to a storage volume, the path selection may be based on incomplete port information at the host. This may result in the host attempting to access the storage volume over a non-optimal path or over a path that is not active.

In a further example, a new storage system is connected to new paths to a host. The new storage system may have functionality (e.g., provided by a program) that is to synchronize data between a first storage system and the new storage system. In such an example, if the first storage system were to receive a path status request from the host, the first storage system may be unable to provide port information relating to the second storage system to access one or more storage volumes including the data being synchronized.

Further, a computing environment with a large quantity of storage systems and hosts, issuing individual path status requests from hosts to storage systems to obtain path statuses can be tedious and complex, and may result in incomplete or inaccurate information regarding path statuses. Also, the processing of large quantity of path status requests may be resource intensive due to increased usage of communication resources and processing resources.

"Port information" can include any or some combination of the following: a collection of storage volumes accessible over each port of a storage controller, a collection of ports that present each storage volume (a port that presents a storage volume refers to a port over which the storage volume is accessible), a collection of ports in each port group, and an access state of each port group. More generally, "port information" can include information about storage volumes, port groups, and access states of port groups.

Note that the term "port group" can refer to a group of ports (a group of ports can include one port or multiple ports), or the term "port group" can refer to an individual port.

In accordance with some implementations of the present disclosure, a port information management system is used to collect port information relating to multiple paths to storage volumes that can be used by hosts to access the storage volumes. The management system is able to merge the port information relating to the multiple paths. Subsets of the merged port information can be provided by the management system for use by hosts in path selection.

Figure 1:
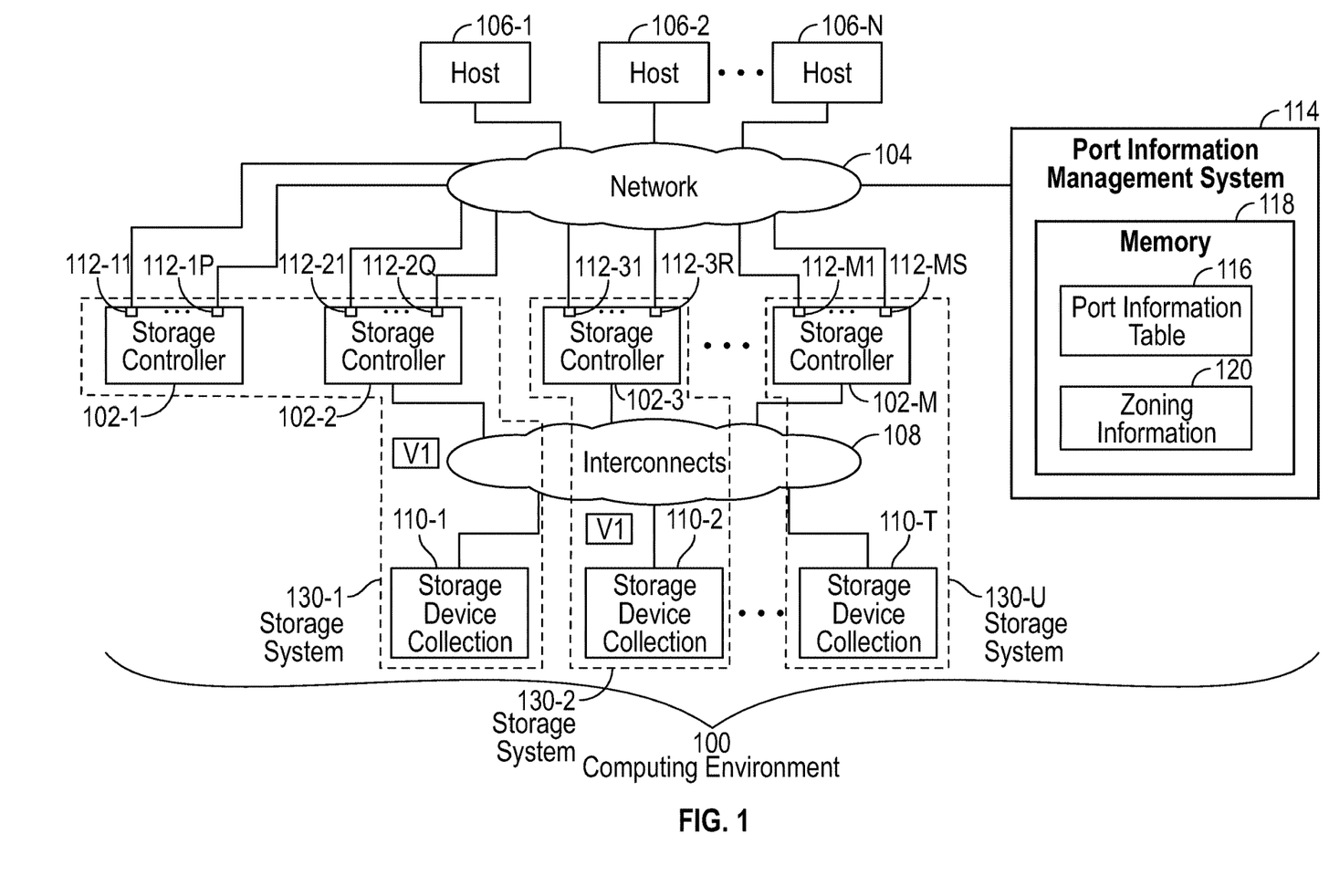
FIG. 1 is a block diagram of an arrangement including storage systems, hosts that are able to access the storage systems, and a port information management system according to some examples.

FIG. 1 is a block diagram of an example computing environment 100 that includes storage controllers 102-1, 102-2, 102-3, . . . , 102-M (where M≥1). The storage controllers 102-1 to 102-M are connected over a network 104 to various hosts 106-1, 106-2, . . . , 106-N (N≥1).

The storage controllers 102-1 to 102-M are coupled over interconnects 108 to respective storage device collections 110-1, 110-2, . . . , 110-T (T≥1). A storage device collection can include a single storage device or multiple storage devices. Note that M may be equal to or different from T. A storage system can include one or more storage controllers and one or more storage device collections.

The interconnects 108 can include Serial Attached SCSI (SAS) interconnects, Ethernet interconnects, InfiniBand interconnects, Nonvolatile Memory Express (NVMe) interconnects, NVMe over fabric (NVMe-oF) interconnects, and so forth.

In some examples, a "storage system" can include one or more storage controllers, one or more storage device collections, and interconnect(s) between the storage controller(s) and the storage device collection(s). Any of the storage controllers 102-1 to 102-M can access data stored by any of the storage device collections 110-1 to 110-T over the interconnects 108. Alternatively, the interconnects 108 may be configured such that storage controllers 102-1 to 102-M are only able to access data for a single storage system 130-1 to 130-U.

FIG. 1 shows a storage system 130-1 that includes the storage controllers 102-1 and 102-2 and the storage device collection 110-1 (as well as the interconnects 108 between the storage controllers 102-1 and 102-2 and the storage device collection 110-1), a storage system 130-2 includes the storage controller 102-3 and the storage device collection 110-2 (as well as the interconnects between the storage controller 102-3 and the storage device collection 110-2), and a storage system 130-U (U≥1) includes the storage controller 102-M and the storage device collection 110-T (as well as the interconnects 108 between the storage controller 102-M and the storage device collection 110-T). Note that any of the storage systems 130-1 to 130-U can include more than one storage device collection.

Each storage controller 102-$i$ (i=1 to M) can include a collection of ports. For example, the storage controller 102-1 includes ports 112-11 to 112-1P (P≥1), the storage controller 102-2 includes ports 112-21 to 112-2Q (Q≥1), the storage controller 102-3 includes ports 112-31 to 112-3R (R≥1), and the storage controller 102-M includes ports 112-M1 to 112-MS (S≥1). In the example of FIG. 1, the ports of the storage controllers 102-1 and 102-2 are considered ports of the storage system 130-1, the ports of the storage controller 102-3 are considered ports of the storage system 130-2, and the ports of the storage controller 102-3 are considered ports of the storage system 130-U.

In examples where a storage system 130-$j$ (j=1 to U) includes multiple ports, the ports of the storage system 130-$j$ can be partitioned into a port group or multiple port groups. A port group is associated with a respective access state. If a port group includes multiple ports (from one storage controller or multiple storage controllers of a storage system), the multiple ports of the port group can share a common access state. More generally, ports of a storage system that includes one or more storage controllers can be partitioned into port groups.

Examples of access states of a port group can include any or some combination of the following: active optimized, active non-optimized, standby, unavailable, offline, transitioning, logical block dependent, etc. In some examples, the access states can be grouped into an active access state group that includes access states that are active (e.g., active optimized, active non-optimized, etc.), and an inactive access state group that includes access states that are not active (e.g., standby, unavailable, offline, etc.). The transitioning state is a special case of not active but moving between states and may become active or not active.

A port group with an access state that is part of the active access state group is a port group that can be used by a host to access a particular storage volume group (including a single storage volume or multiple storage volumes). A port group with an access state that is part of the inactive access state group is a port group that is not to be used to access a particular storage volume group.

A port group with a standby state is a port group that is not active and not able to access a storage volume but that is able to be transitioned to an access state in the active access state group due to another port group becoming not active.

An active optimized port group (that has an active optimized state) is an active port group that is an optimal port group to use for access of a particular storage volume group. An optimal port group is a port group (from among multiple active port groups if present) that can be used to access data of the particular storage volume group with a lower latency or with a metric that indicates superior performance and/or lower cost. Note that there may be multiple optimal port groups to access data of the particular storage volume group.

An active non-optimized port group (that has an active non-optimized state) is a port group that is not an optimal port group to use for access of a particular storage volume group, e.g., the active non-optimized port group has a higher latency or has a metric that indicates inferior performance and/or higher cost when compared to the corresponding active optimized port group for accessing the particular storage volume group.

An unavailable port group is a port group that can process commands (e.g., SCSI commands) but that is not able to access a storage volume. An offline port group is a port group that is currently disabled (unable to process commands such as SCSI commands). A transitioning port group is a port group that is moving between states, such as an offline port that has been turned on but has not completed power on processing. A logical block dependent port group is a port group for which a host may get different port states depending on what addresses are requested.

In an example, a storage volume V1 can be presented by each of the storage systems 130-1 and 130-2, such that a host can access the storage volume V1 over multiple possible paths to the multiple storage systems 130-1 and 130-2.

The computing environment 100 further includes a port information management system 114 that is used to collect port information relating to multiple paths to storage volumes stored in the storage device collections 110-1 to 110-M. The port information management system 114 can be implemented using a computer or multiple computers. The port information management system 114 can be separate from the hosts 106-1 to 106-N and storage controllers 102-1 to 102-M. For example, the port information management system 114 can be implemented with network devices (e.g., switches, routers, etc.) that are part of the network 104 and/or can be implemented using other device(s). Alternatively, the port information management system 114 can be implemented in one or more hosts 106-1 to 106-N and/or in one or more storage controllers 102-1 to 102-M.

The port information management system 114 includes a memory 118 that stores a port information table 116 and zoning information 120 (discussed further below).

Figure 2:
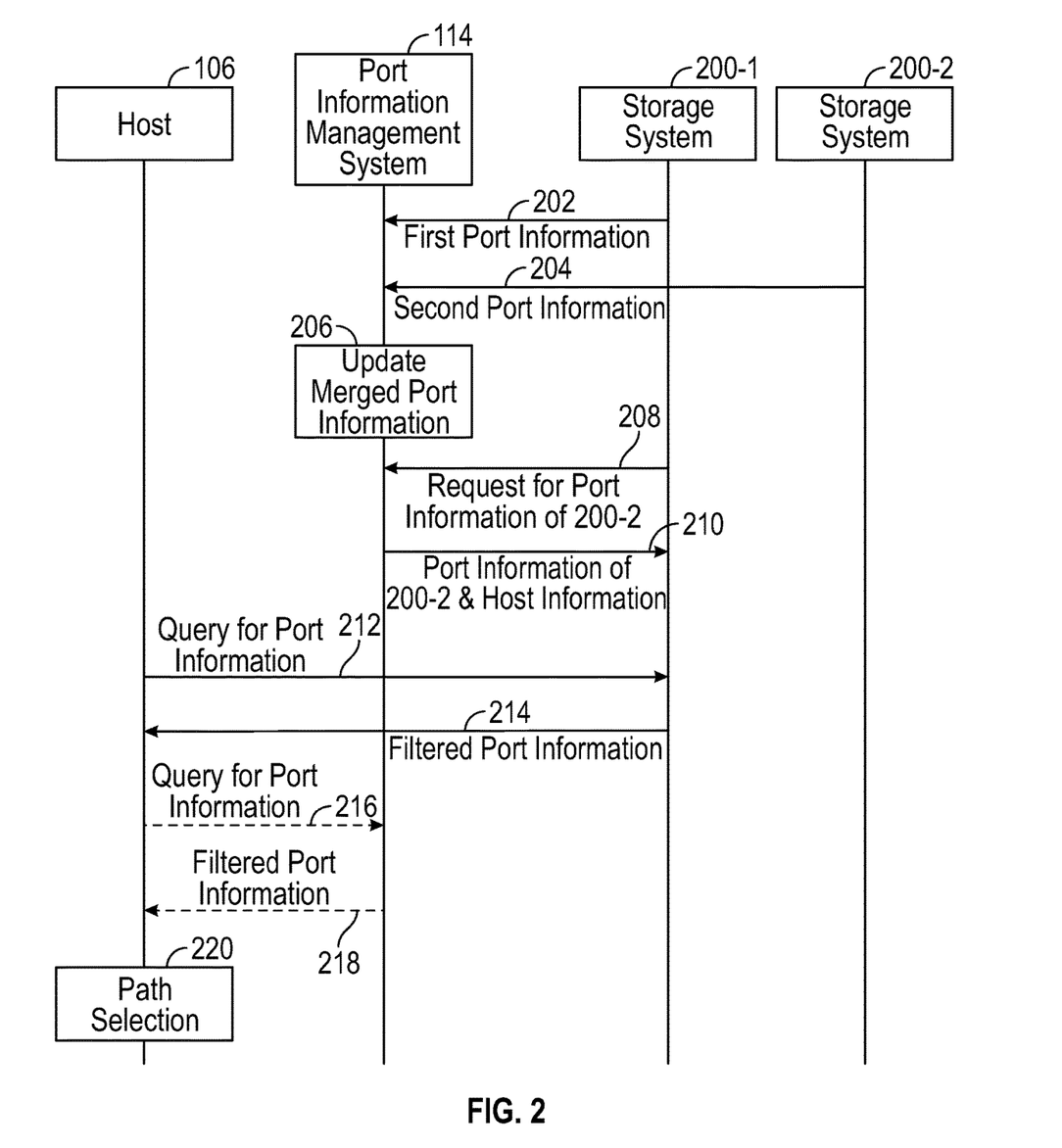
FIG. 2 is a flow diagram of a process performed by a host, storage systems, and a port information management system, according to some examples.

FIG. 2 is a flow diagram of a process performed by a host 106 (which can be any of the hosts 106-1 to 106-N in FIG. 1), the port information management system 114, and storage systems 200-1 and 200-2. Although only one host and two storage systems are depicted in the FIG. 2, it is noted that similar techniques can be applied in an arrangement that includes additional hosts and/or additional storage systems. The storage systems 200-1 or 200-2 can include any of the storage systems 130-1 to 130-U in FIG. 1.

The storage system 200-1 sends (at 202) first port information to the port information management system 114, and the storage system 200-2 sends (at 204) second port information to the port information management system 114. As noted above, port information can include any or some combination of the following: a collection of storage volumes accessible over each port of a storage system, a collection of ports that present each storage volume, a collection of ports in each port group, and an access state of each port group.

In some examples, when a storage system registers or otherwise establishes a connection with the port information management system 114, the storage system can send port information to the port information management system 114. In other examples, the port information management system 114 can query each storage system to obtain the respective port information.

In some examples, a storage system can send port information to a management interface, which can be implemented by any of various different entities. In an example, the management interface can be part of or be presented by the port information management system 114. In other examples, the management interface can be implemented with an intermediary system between the storage controllers 102-1 to 102-M and the port information management system 114.

In some examples, the management interface can be in the form of an application programming interface (API), which includes various routines that can be invoked by an entity (e.g., a storage controller, the port information management system 114, etc.) to perform management-related tasks, including reporting of port information of a storage system. In other examples, other types of management interfaces can be employed, such as in the form of data structures (e.g., databases, information repositories, etc.) that are accessible by the storage controllers 102-1 to 102-M and the port information management system 114.

The port information management system 114 obtains the first and second port information sent by the first and second storage system 200-1 and 200-2, respectively. The port information management system 114 can obtain the first and second port information in one of various different ways. For example, the port information management system 114 can obtain the first and second port information by receiving the first and second port information from the first and second storage system 200-1 and 200-2 through the management interface. Alternatively, the first and second storage system 200-1 and 200-2 can write the first and second port information, respectively, to specified data structure(s) that are stored in a shared storage. The port information management system 114 can query the data structure(s) to retrieve the first and second port information.

The port information management system 114 updates (at 206), based on the first and second port information, merged port information in a port information data structure, such as the port information table 116 (FIG. 1) or another type of data structure. If the port information table 116 does not yet exist, the updating performed at 206 by the port information management system 114 includes building the port information table 116. If the port information table 116 already exists, then the updating includes modifying the port information table 116, by adding entries to the port information table 116 and/or replacing information in entries of the port information table 116.

The merged port information can include port information from multiple storage systems (or more generally, from multiple ports of one or more storage systems). The port information table 116 can be stored in the memory 118 of the port information management system 114. The memory 118 can include any or some combination of the following:

dynamic random access memory (DRAM) device(s), static random access memory (SRAM) device(s), flash memory device(s), and so forth.

The merged port information of the port information table 116 includes information of ports, storage volume groups and access states of port groups that are part of the computing environment 100.

An example of the port information table 116 is depicted in Table 1 below.

TABLE 1

| Port Group | Storage Volume Group | Storage Volumes | Access State |
| --- | --- | --- | --- |
| Port-1 | VOLGRP-1 | A, B, C | Active optimized |
| Port-1 | VOLGRP-2 | D, E, F | Active non-optimized |
| Port-2 | VOLGRP-3 | G | Standby |
| Port-4, Port-5 | VOLGRP-4 | H, I, J | Active optimized |
| Port-3 | VOLGRP-1 | A, B, C | Standby |

The example port information table of Table 1 can include the following attributes in respective columns of the port information table: a port group attribute that indicates a port group of a storage system, a storage volume group identifier attribute that identifies a storage volume group, a storage volume identifier attribute that identifies storage volume(s) in the respective storage volume group identified by the storage volume group attribute, and an access state attribute that specifies the access state for the respective port group indicated by the port group attribute.

In other examples, a port information table can have a different arrangement of attributes and/or may include additional attribute(s) or alternative attribute(s), and/or some of the attribute(s) may be omitted. In further examples, the port information table may include a collection of multiple tables at multiple levels, where a first level table includes a subset of the port information that is consulted first, followed by consulting a second level table.

In further examples, different hosts may be associated with different port information tables for scenarios where not every host gets the same response to a path status request. In other examples, other selection mechanisms can be employed for determining a response to a path status request from a given host.

The first row of the port information table of Table 1 indicates a first port group that includes just Port-1 that can be used to access a storage volume group VOLGRP-1. According to the first row of the port information table of Table 1, the storage volume group VOLGRP-1 has storage volumes A, B, and C, and the access state of the first port group for accessing the storage volume group VOLGRP-1 is active optimized.

The fifth row of the port information table of Table 1 indicates another port group (a second port group that includes just Port-3) that can be used to access the storage volume group VOLGRP-1 if the first port group were to become unavailable. According to the fifth row of the port information table of Table 1, the access state of the second port group for accessing the storage volume group VOLGRP-1 is standby.

The second row of the port information table of Table 1 indicates that the first port group (that includes just Port-1) can be used to access another storage volume group VOLGRP-2. According to the second row of the port information table of Table 1, the storage volume group VOLGRP-2 has storage volumes D, E, and F, and the access state of the first port group for accessing the storage volume group VOLGRP-2 is active non-optimized.

The third row of the port information table of Table 1 indicates that a third port group (that includes just Port-2) can be used to access a storage volume group VOLGRP-3. According to the third row of the port information table of Table 1, the storage volume group VOLGRP-3 has a storage volume G, and the access state of the third port group for accessing the storage volume group VOLGRP-3 is standby.

The fourth row of the port information table of Table 1 indicates that a fourth port group (that includes Port-4 and Port-5) can be used to access a storage volume group VOLGRP-4. According to the fourth row of the port information table of Table 1, the storage volume group VOLGRP-4 has a storage volumes H, I, and J, and the access state of the fourth port group for accessing the storage volume group VOLGRP-4 is active optimized.

In some examples, the merged port information of the port information table of Table 1 can include port information for ports of multiple storage systems. The ports of different storage systems can have unique identifiers (such as Port-1 and Port-2 in the example port information table). In other words, ports in different storage systems would not share a port identifier. In other examples, a port information table can include another column that identifies a storage system, such that port identifiers across multiple storage systems can be shared. In such latter examples, the combination of a storage system identifier and a port identifier would uniquely identify a storage system port.

A storage volume may be shared and accessible from multiple storage systems having port groups with the same access state or different access states. In the above example port information table (Table 1), the storage volume group VOLGRP-3 with the storage volume G is accessible by a port group that has a standby access state. Further, the storage volume group VOLGRP-3 with the storage volume G may be accessible from a port group that has the active optimized state in another storage system.

As further shown in FIG. 2, the storage system 200-1 can issue (at 208) a request to the port information management system 114 to obtain port information of the storage system 200-2. In an example, the storage system 200-1 can issue such a query during a data migration of data from the storage system 200-1 to the storage system 200-2. The request can be issued by the storage system 200-1 either (1) in response to performance of the data migration, or (2) in response to another event (e.g., a host requesting port information from the storage system 200-1 such as in task 212) during the data migration. In further examples, the request can be issued by the storage system 200-1 in response to any other event.

In response to the request from the storage system 200-1, the port information management system 114 sends (at 210) port information of the ports of the storage system 200-2, along with information of hosts (e.g., host identifiers) zoned with the storage system 200-2. In some examples, multiple zones can be defined in the computing environment 100, where each zone includes a collection of storage systems and hosts. Hosts that are part of a given zone are able to access storage systems in the given zone, but are unable to access storage systems in another zone.

In some examples, the port information sent (at 210) from the port information management system 114 to the storage system 200-1 is a subset of the port information table 116 that contains information of ports of the storage system 200-2. The port information management system 114 has access to the zoning information 120 (FIG. 1) that correlates hosts (host ports) to storage volume groups, and that identifies the zones that specific hosts and storage systems are part of. For example, the zoning information 120 can be stored in the memory 118 of the port information management system 114, or the zoning information 120 can be stored elsewhere. The zoning information 120 can be used by the port information management system 114 to determine which hosts have (and/or does not have) access to which storage volume groups.

The port information management system 114 can use the zoning information 120 to identify which host(s) are in the same zone as the storage system 200-2 for which the storage system 200-1 has requested port information. The information of hosts zoned with the storage system 200-2 sent by the port information management system 114 to the storage system 200-1 is based on the zoning information 120.

In other examples, zones are not defined, and any host can access any storage system in the computing environment 100.

As noted above, port information can be used by hosts to select a path for accessing a storage volume. For example, given multiple candidate paths for accessing a particular storage volume group in which a first candidate path includes a first storage system port that is active optimized, a second candidate path includes a second storage system port that is active non-optimized, and a third candidate path includes a third storage system port that is standby, a host can select the first candidate path for accessing a storage volume of the particular storage volume group.

In some examples, the host 106 can send (at 212) a query for port information to the storage system 200-1. Note that the host 106 can send a query for port information to any storage system that is zoned with the host 106.

In response to the query from the host 106, the storage system 200-1 filters port information available to the storage system 200-1 to identify a subset of the port information that is relevant to the host 106. The port information available to the storage system 200-1 can include the port information of the ports of the storage system 200-2 sent by the port information management system 114 to the storage system 200-1.

In an example, the storage system 200-1 can use zoning information (similar to 120 but accessible to the storage system 200-1) to identify storage volume group(s) that the host 106 can access, and can produce filtered port information of ports of the storage system(s) that store(s) storage volumes of the identified storage volume group(s).

In some examples, the query is received from a host port of the host 106, and the filtered port information relates to ports relevant to the host port (e.g., port information of ports of storage system(s) that are part of the zone of the host port). The storage system 200-1 sends (at 214) the filtered port information to the host 106.

In further examples, instead of or in addition to being able to query a storage system for port information, the host 106 can query (at 216) the management interface associated with the port information management system 114 for port information. The query submitted by the host 106 to the management interface is sent to the port information management system 114.

In response to the query from the host 106, the port information management system 114 filters the merged information of the port information table 116 to identify a subset of the merged information that is relevant to the host 106. For example, the port information management system 114 can use the zoning information 120 to identify storage volume group(s) that the host 106 can access, and can produce filtered port information of ports of the storage system(s) that store(s) storage volumes of the identified storage volume group(s).

In some examples, the query is received from a host port of the host 106, and the filtered port information relates to ports relevant to the host port (e.g., port information of ports of storage system(s) that are part of the zone of the host port). The port information management system 114 sends (at 218) the filtered port information to the host 106.

Based on the port information received at the host 106 from either or both of the storage system 200-1 or the port information management system 114, the host 106 can perform (at 220) path selection to select a path from multiple candidate paths for accessing a storage volume. For example, the storage volume may be accessible over ports of multiple storage systems. The host 106 can use the access states of the ports of the multiple storage systems to determine which path to use for accessing the storage volume.

By using techniques or mechanisms according to some examples of the present disclosure, port information of multiple storage systems can be consolidated at the port information management system 114 to use in answering requests for port information from storage systems and/or hosts. In this way, the port information management system 114 is able to provide port information of another storage system that a given storage system may not be able to obtain by itself. Further, in examples where zoning is implemented, the port information management system 114 can use zoning information to produce filtered port information that is relevant to port information requests from hosts.

Figure 3:
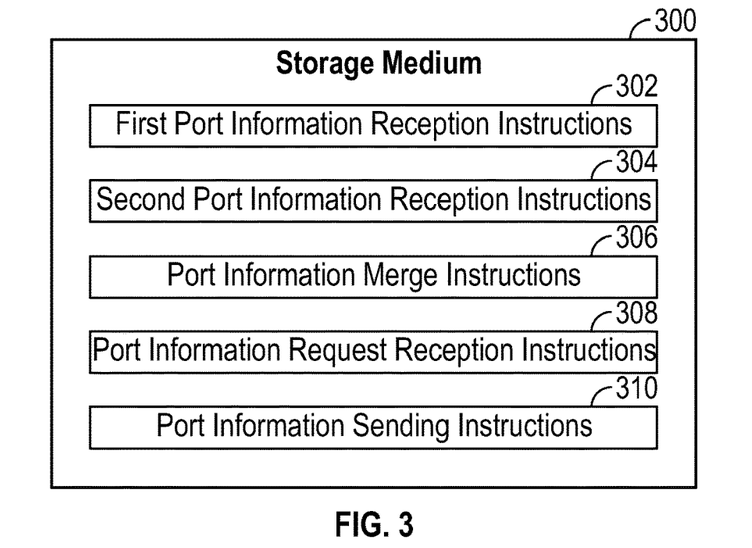
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a management system (e.g., the port information management system 114 of FIG. 1) to perform various tasks.

The machine-readable instructions include first port information reception instructions 302 to receive, from a first storage system, first port information of ports in the first storage system. The machine-readable instructions include second port information reception instructions 304 to receive, from a second storage system, second port information of ports in the second storage system. In some examples, the management system can receive the first and second port information in response to requests from the management system to the first and second storage systems, respectively. In other examples, the first and second storage systems can send the first and second port information to the management system based on a specified activity of each respective storage system, such as part of a registration performed by the respective storage system with the management system.

The machine-readable instructions include port information merge instructions 306 to merge the first port information from the first storage system and the second port information from the second storage system into merged port information. For example, the merged port information can be part of the port information table 116 of FIG. 1.

The machine-readable instructions include port information request instructions 308 to receive, from the first storage system, a request for port information of ports in the second storage system. In some examples, the request from the first storage system for the port information of the ports in the second storage system is made during data migration from the first storage system to the second storage system.

The machine-readable instructions include port information sending instructions 310 to send, to the first storage system, the second port information for use in path selection from hosts to the first and second storage systems. For example, In some examples, the first or second port information includes information of a logical group of storage volumes that a respective port of the first or second storage system is able to access. In some examples, the first or second port information further includes identifiers of storage volumes that are part of the logical group of storage volumes.

In some examples, the first or second port information includes an access state of a respective port group of the ports in the first or second storage system. The access state of the respective port group indicates a state relating to an access of the respective port group for accessing one or more storage volumes stored by the first or second storage system.

In some examples, the access state of the respective port group indicates whether the respective port group is active or not active for accessing the one or more storage volumes (e.g., whether the access state is part of the active access state group or the inactive access state group noted above). In some examples, the access state of the respective port group if part of the active access state group indicates whether the respective port group is an optimized port group or a non-optimized port group for accessing the one or more storage volumes.

In some examples, the management system can query a management interface for each of the first port information and the second port information, where the first storage system is to report the first port information to the management interface, and the second storage system is to report the second port information to the management interface.

Figure 4:
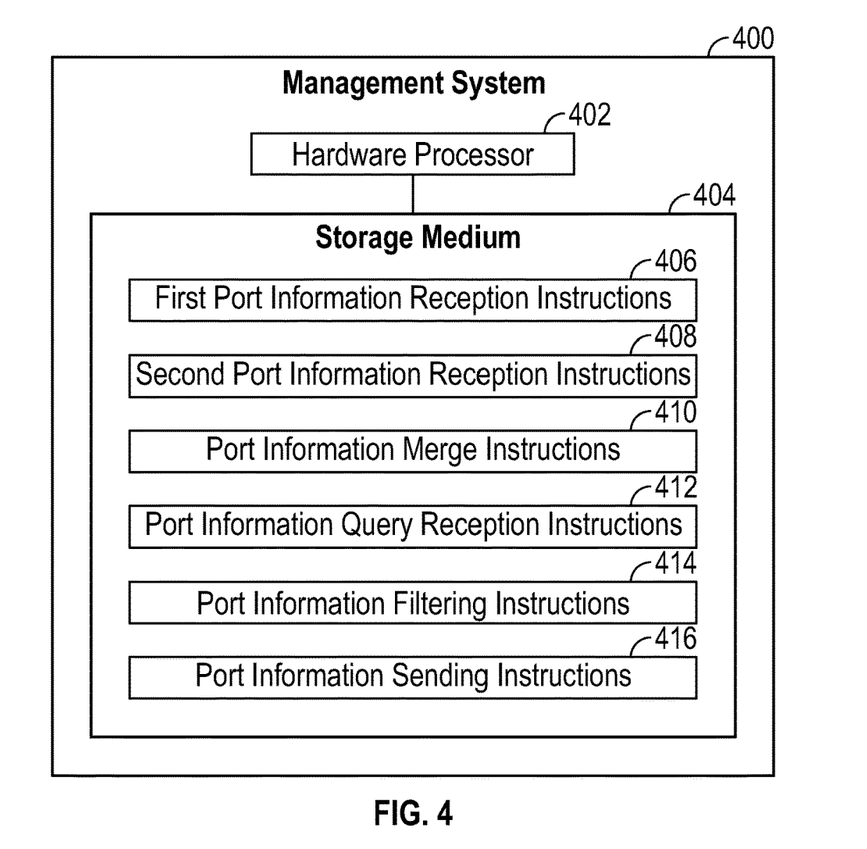
FIG. 4 is a block diagram of a management system according to some examples.

FIG. 4 is a block diagram of a management system 400. An example of the management system 400 is the port information management system 114 of FIGS. 1 and 2.

The management system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The management system 400 includes a storage medium 404 that stores machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions include first port information reception instructions 406 to receive, from a first storage system, first port information of ports in the first storage system. The machine-readable instructions include second port information reception instructions 408 to receive, from a second storage system, second port information of ports in a second storage system.

The machine-readable instructions include port information merge instructions 410 to merge the first port information from the first storage system and the second port information from the second storage system into merged port information.

The machine-readable instructions include port information query reception instructions 412 to receive, from a host, a query for port information of ports in storage systems. The query from the host can be query sent at 216 in FIG. 2, for example.

The machine-readable instructions include port information filtering instructions 414 to filter, in response to the query, the merged port information to produce filtered port information for the host. The filtering may be based on zoning information, for example.

The machine-readable instructions include port information sending instructions 416 to send, to the host, the filtered port information for use in path selection by the host in accessing storage volumes.

Figure 5:
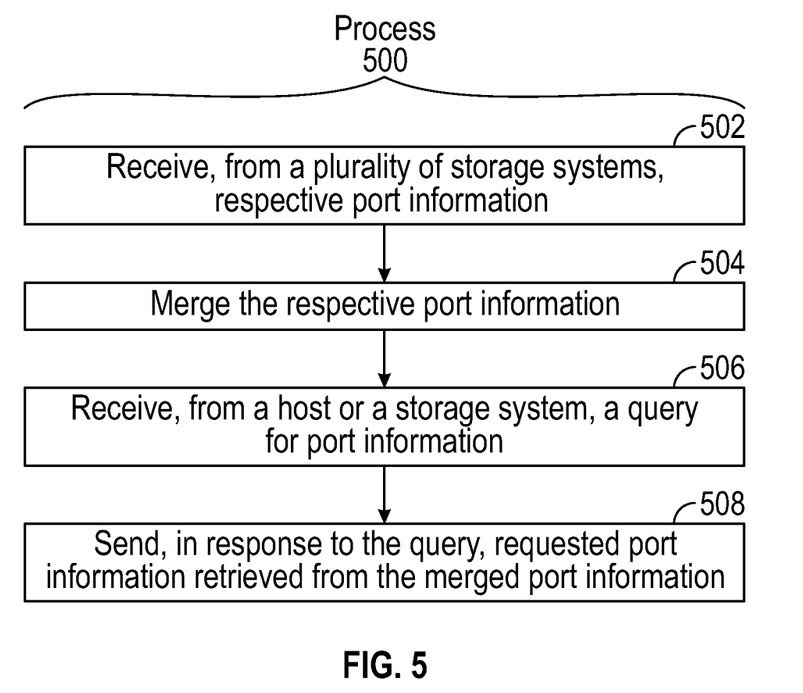
FIG. 5 is a flow diagram of a process according to some examples.

FIG. 5 is a flow diagram of a process 500 according to some examples. The process 500 includes receiving (at 502), at the management system from a plurality of storage systems, respective port information of ports in corresponding storage systems of the plurality of storage systems.

The process 500 includes merging (at 504), by the management system, the respective port information from the plurality of storage systems into merged port information. The merged port information including information of storage volume groups and access states of port groups.

The process 500 includes receiving (at 506), at the management system from a host or a storage system, a query for port information of ports in storage systems.

The process 500 includes sending (at 508), by the management system in response to the query, requested port information retrieved from the merged port information for use in path selection by the host in accessing storage volumes A storage medium (300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a management system to:
   query a management interface for first port information of ports in a first storage system and second port information of ports in a second storage system;
   receive, from the first storage system, the first port information of ports in the first storage system, wherein the first storage system is to report the first port information to the management interface;

receive, from the second storage system, the second port information of ports in the second storage system, where the second storage system is to report the second port information to the management interface;

merge the first port information from the first storage system and the second port information from the second storage system into merged port information; and receive, from the first storage system, a request for port information of ports in the second storage system; and send, to the first storage system, the second port information for use in path selection from hosts to the first and second storage systems.

2. The non-transitory machine-readable storage medium of claim 1, wherein the instructions upon execution cause the management system to send the second port information to the first storage system by sending the merged port information to the first storage system.

3. The non-transitory machine-readable storage medium of claim 1, wherein the request from the first storage system for the port information of the ports in the second storage system is during data migration from the first storage system to the second storage system.

4. The non-transitory machine-readable storage medium of claim 1, wherein the first port information comprises information of a logical group of storage volumes that a respective port of the first storage system is able to access.

5. The non-transitory machine-readable storage medium of claim 4, wherein the first port information further comprises identifiers of storage volumes that are part of the logical group of storage volumes.

6. The non-transitory machine-readable storage medium of claim 1, wherein the first port information comprises an access state of a respective port group of the ports in the first storage system, wherein the access state of the respective port group indicates a state relating to an access of the respective port group for accessing one or more storage volumes stored by the first storage system.

7. The non-transitory machine-readable storage medium of claim 6, wherein the access state of the respective port group indicates whether the respective port group is active or not active for accessing the one or more storage volumes.

8. The non-transitory machine-readable storage medium of claim 6, wherein the access state of the respective port group indicates whether the respective port group is an optimized port group or a non-optimized port group for accessing the one or more storage volumes.

9. The non-transitory machine-readable storage medium of claim 1, wherein the receiving of the first port information comprises receiving port group information from the first storage system.

10. The non-transitory machine-readable storage medium of claim 1, wherein the request for port information from the first storage system is responsive to a request of a host.

11. The non-transitory machine-readable storage medium of claim 1, wherein the instructions upon execution cause the management system to:

receive, from a host, a query for port information; and in response to the query:

filter the merged port information to obtain a subset of the merged port information relating to ports relevant to the host, and provide the subset of the merged port information to the host.

12. The non-transitory machine-readable storage medium of claim 11, wherein the filtering of the merged port information is based on zoning information that correlates hosts to respective storage volumes.

13. The non-transitory machine-readable storage medium of claim 11, wherein the query is received from a host port of the host, and the subset of the merged port information relates to ports relevant to the host port.

14. A management system comprising:

a hardware processor; and a non-transitory storage medium storing instructions executable on the hardware processor to:

receive, from a first storage system, first port information of ports in the first storage system;

receive, from a second storage system, second port information of ports in a second storage system;

merge the first port information from the first storage system and the second port information from the second storage system into merged port information; and receive, from a host, a query for port information of ports in storage systems;

in response to the query:

filter the merged port information to obtain a subset of the merged port information relating to ports relevant to the host; and provide, to the host, the filtered subset of the port information for use in path selection by the host in accessing storage volumes.

15. The management system of claim 14, wherein the instructions are executable on the hardware processor to:

filter the merged port information based on zoning information that correlates hosts to storage volume groups.

16. The management system of claim 14, wherein a respective port information of the first port information or the second port information comprises information of a logical group of storage volumes that a port of a respective storage system of the first storage system or the second storage system is able to access.

17. The management system of claim 14, wherein a respective port information of the first port information or the second port information comprises an access state of a respective port group of the ports in a respective storage system of the first storage system or the second storage system, wherein the access state of the respective port group indicates a state relating to an access of the respective port group for accessing one or more storage volumes stored in the respective storage system.

18. A method of a management system comprising a hardware processor, comprising:

receiving, at the management system from a plurality of storage systems, respective port information of ports in corresponding storage systems of the plurality of storage systems;

merging, by the management system, the respective port information from the plurality of storage systems into merged port information, the merged port information comprising information of storage volume groups and access states of port groups; and receiving, at the management system from a host or a storage system, a query for port information of ports in storage systems; and in response to the query:

filtering the merged port information to obtain a subset of the merged port information relating to ports relevant to the host, and providing the subset of the merged port information to the host from the management system for use in path selection by the host in accessing storage volumes.

19. The method of claim 18, further comprising:
  filtering, by the management system, the merged port information to produce the requested port information, the filtering based on zoning information that correlates hosts to storage volume groups.

\* \* \* \* \*